United States Patent [19]

Cowett, Jr.

[11] Patent Number: 5,291,119
[45] Date of Patent: Mar. 1, 1994

[54] LOW DISTORTION ALTERNATING CURRENT OUTPUT ACTIVE POWER FACTOR CORRECTION CIRCUIT USING TWO BI-DIRECTIONAL SWITCHING REGULATIONS

[75] Inventor: Philip M. Cowett, Jr., Baltimore, Md.

[73] Assignee: AlliedSignal Inc., Morris Township, Morris County, N.J.

[21] Appl. No.: 864

[22] Filed: Jan. 5, 1993

[51] Int. Cl.⁵ .............................................. H02M 1/12
[52] U.S. Cl. ..................... 323/207; 363/39; 363/131
[58] Field of Search ................. 323/207, 265, 349; 363/79, 39, 40, 41, 43, 95, 131

[56] References Cited

U.S. PATENT DOCUMENTS

| | | | |
|---|---|---|---|
| 4,106,085 | 8/1978 | Demarest et al. | 363/51 |
| 4,130,861 | 12/1978 | LaForest | 363/39 |
| 4,529,925 | 7/1985 | Tanaka et al. | 323/207 |
| 4,651,265 | 3/1987 | Stacey et al. | 363/35 |
| 4,677,366 | 6/1987 | Wilkinson et al. | 323/222 |
| 4,780,660 | 10/1988 | Shima et al. | 323/207 |
| 4,833,585 | 5/1989 | Moran | 363/39 |
| 5,045,991 | 9/1991 | Dhyanchand et al. | 363/89 |
| 5,047,912 | 9/1991 | Pelly | 363/89 |
| 5,057,990 | 10/1991 | Gulczynski | 363/131 |
| 5,138,247 | 8/1992 | Tanoue et al. | 323/207 |
| 5,138,249 | 8/1992 | Capel | 323/283 |
| 5,162,983 | 11/1992 | Kumagai | 363/39 |

OTHER PUBLICATIONS

Micro Linear; "1990 Data Book, Semi-Standard Analog", ML4812 pp. 5-20 through 5-30, Sep. 1989.
Sola, "User's Handbook for the 57 Series"; Nov. 11, 1989, pp. 1-1 through 1-7.
Lloyd H. Dixon, Jr., "High Power Factor Preregulators for Off-Line Power Supplies"; Copyright 1988, pp. 6-1 through 6-16.

Primary Examiner—Steven L. Stephan
Assistant Examiner—Ben M. Davidson
Attorney, Agent, or Firm—Howard G. Massung

[57] ABSTRACT

A circuit wherein a current sensing device is incorporated in an AC input line. An AC output is taken from the output of said current sensing device and from an other AC input line. Circuitry including two bi-directional switching regulators (positive and negative) and two energy storage capacitors adds current to or subtracts current from the instantaneous output load current. The arrangement is such that the AC output is equal to the AC input with no regulation effect. Substantially one hundred percent efficiency results when very little power factor correction is required.

10 Claims, 3 Drawing Sheets

LOW DISTORTION ALTERNATING CURRENT OUTPUT ACTIVE POWER FACTOR CORRECTION CIRCUIT USING TWO BI-DIRECTIONAL SWITCHING REGULATIONS

CROSS REFERENCE TO RELATED APPLICATIONS

This application is related to co-pending, commonly assigned U.S. application Ser. Nos. 000,862 for a Low Distortion Alternating Current Output Active Power Factor Correction Circuit Using Bi-directional Bridge Rectifier and Bi-Directional Switching Regulator, and 000,863 for a Low Distortion Alternating Current Output Active Power Factor Correction Circuit Using Capacitor Coupled Bi-directional Switching Regulator, both of said applications filed on even date herewith by the present applicant.

BACKGROUND OF THE INVENTION

Direct current (DC) output active power factor correction circuits are known in the art. However, prior to the present invention, alternating current (AC) output active power factor correction circuits were not considered viable. Accordingly, this invention relates to modifying the prior art DC circuits to provide an AC output.

In DC output circuits of the type described, a bulk energy storage capacitor is used and charging current into the bulk energy storage capacitor is proportional to the square of the instantaneous AC input line voltage. The current extracted from the AC line is proportional to the instantaneous AC line voltage.

In operation, the AC input or line voltage is full wave rectified by a diode bridge rectifier to provide a rectified sine wave or unfiltered DC output. This output is applied to the input of a switching regulator which is typically a boost converter having an output which is greater than the highest peak input voltage. The feedback loop which regulates the output voltage is modified by adding circuitry to multiply the output of its error amplifier by a sample of the rectified AC input voltage, and comparing this with the sensed current. The resultant signal is used to control the instantaneous duty-cycle of the switching regulator. This causes the input current waveform to follow the input voltage waveform, resulting in low harmonic distortion and a current waveform which is in phase with the voltage waveform.

In order to provide an AC output, the arrangement described above is modified in accordance with the present invention as will be hereinafter described and features two bi-directional switching regulators. This is in contrast to the arrangement disclosed in the aforenoted U.S. application Ser. No. 000,862 which features bi-directional bridge rectifier and bi-directional switching regulator for providing the AC output, and the arrangement disclosed in the aforenoted U.S. application Ser. No. 000,863 which features a capacitor coupled bi-directional switching regulator for providing said AC output.

SUMMARY OF THE INVENTION

This invention contemplates a low distortion AC output active power factor correction circuit wherein a current sensing device is incorporated in an AC input line. The AC output is taken from the output of said current sensing device, and from an other AC input line. Circuitry including two bi-directional bridge switching regulators (positive and negative) and two energy storage capacitors monitors the instantaneous input current and voltage, and causes current to be added or subtracted from the external load current to produce an input current which is proportional to the input voltage. The energy storage capacitors provide auxiliary regulated DC outputs which may be utilized if desired. With an arrangement of the type described, an AC output voltage is provided which is equal to the input voltage (no regulation effect). Substantially one hundred percent efficiency results when very little power factor correction is required, since the load current flows through only the current sensing device.

DETAILED DESCRIPTION OF THE INVENTION

Figure 1:
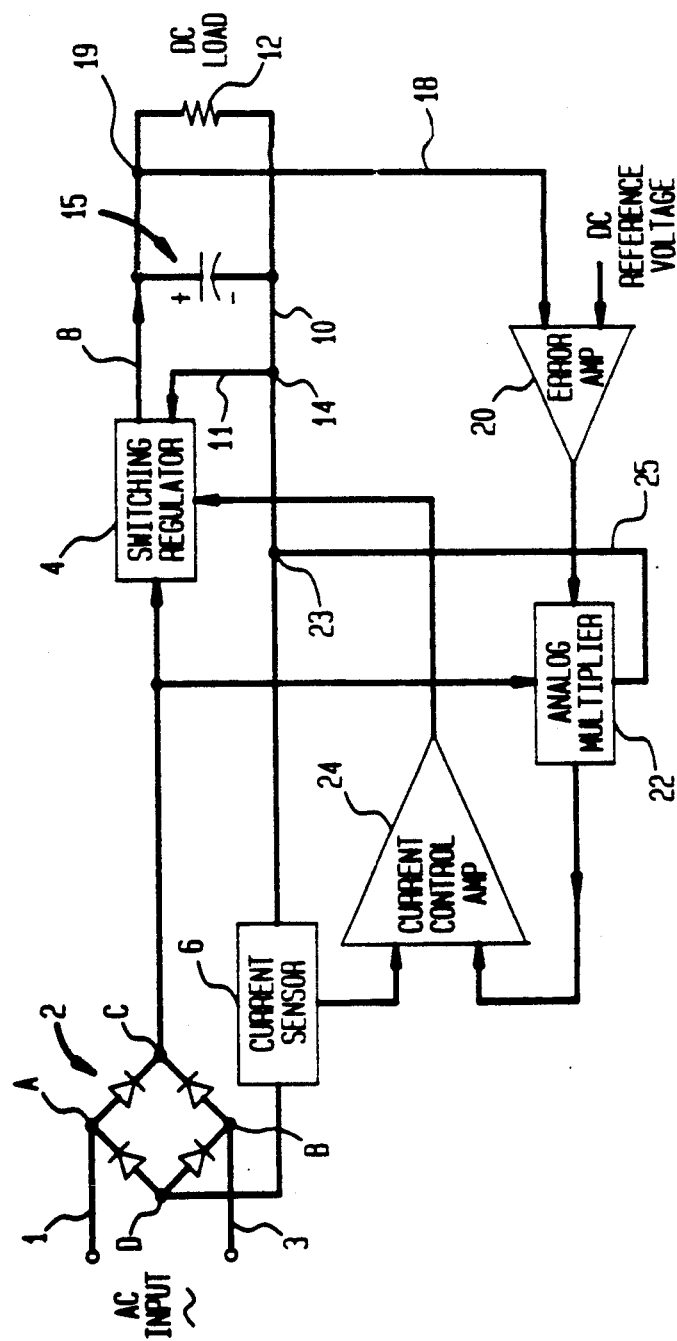
FIG. 1 is an electrical schematic diagram illustrating a prior art DC output power factor correction circuit.

With reference to the prior art circuit shown in FIG. 1, an AC input voltage across input lines 1 and 3 is applied to input terminals A and B of a full wave diode bridge rectifier 2. Bridge rectifier 2 provides a rectified sine voltage output at output terminals C and D thereof.

The output voltage at output terminal C of rectifier 2 is applied to a switching regulator 4 which may be a conventional unidirectional boost converter. The output of bridge rectifier 2 at output terminal D is applied to a current sensor 6.

Switching regulator 4 is connected to an output conductor 8 and current sensor 6 is connected to an output conductor 10. A DC load 12 is connected across conductors 8 and 10. The output from current sensor 6 is applied to switching regulator 4 via conductor 10 and a conductor 11 connected to conductor 10 at a circuit point 14.

A bulk energy storage capacitor 15 is connected across conductors 8 and 10 between circuit point 14 and DC load 12.

A conductor 18 is connected to conductor 8 at a circuit point 19 between capacitor 15 and DC load 12, and is connected to an error amplifier 20. A DC reference voltage is applied to error amplifier 20 which provides an output corresponding to the difference between the input thereto applied via conductor 18 and the reference voltage. The difference output is applied to an analog multiplier 22. Analog multiplier 22 is connected to conductor 10 at a circuit point 23 via a conductor 25.

The output at output terminal C of bridge rectifier 2 is applied to analog multiplier 22. The analog multiplier provides an output which is applied to a current control amplifier 24, as is the output from current sensor 6. Current control amplifier 24 provides an output which is applied to switching regulator 4.

In the circuit shown in FIG. 1, the charging current into bulk energy storage capacitor 15 is proportional to the square of the instantaneous line voltage across AC input lines 1 and 3. The current extracted from the AC input lines is proportional to the instantaneous line voltage.

In operation, the AC input to bridge circuit 2 is full wave rectified by the bridge circuit and the bridge circuit output is in the form of a rectified sine wave, i.e. an unfiltered DC. The unfiltered DC output is applied to the input of switching regulator 4 and a feedback loop including current control amplifier 24 regulates the output from the switching regulator. The feedback loop is modified via analog multiplier 22 by multiplying the output of error amplifier 20 by the output at output terminal C of bridge rectifier 2 and comparing this via current control amplifier 24 with the sensed current from current sensor 6. This causes the input current waveform to follow the input voltage waveform, resulting in low harmonic distortion and a current waveform which is in-phase with the voltage waveform.

Figure 2:
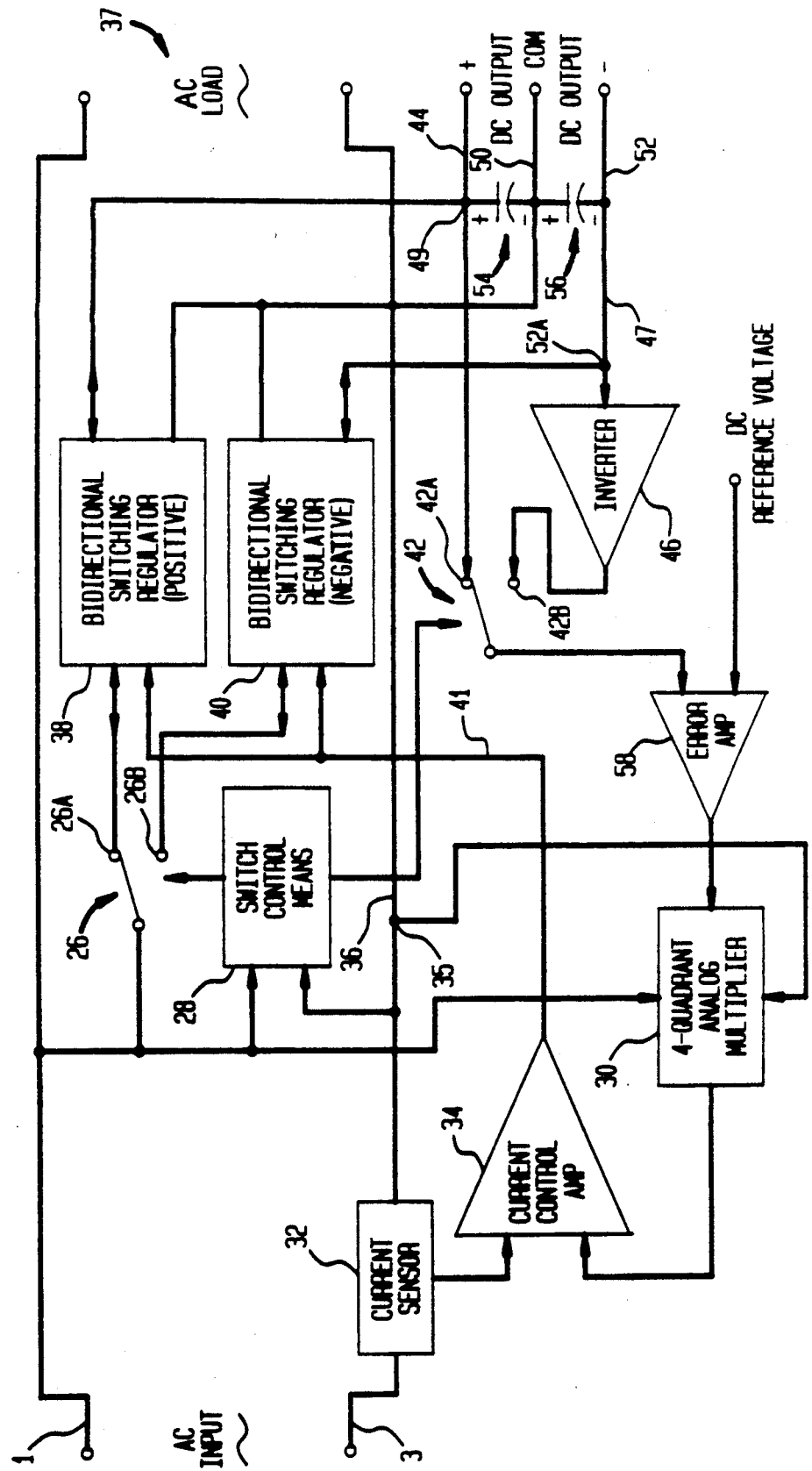
FIG. 2 is an electrical schematic diagram illustrating the invention.

The prior art circuit shown in FIG. 1 is modified as shown in FIG. 2 to provide an AC output in accordance with the present invention, as will be next described.

With reference then to FIG. 2, the AC input voltage across input lines 1 and 3 is applied via line 1 to a bi-directional double throw switch 26, a switch control means 28 and a four-quadrant analog multiplier 30. The AC input voltage is applied via line 3 to a current sensor 32 which applies an output to a current control amplifier 34. Multiplier 30 is connected to amplifier 34 and is connected at a circuit point 35 to an output line 36 leading from current sensor 32. Output line 36 is connected to switch control means 28. An AC load 37 is connected across output conductor 36 leading from current sensor 32 and input line 1.

One terminal 26A of bi-directional double throw switch 26 is connected to a bi-directional switching regulator (positive) 38 and the other terminal 26B of switch 26 is connected to a bi-directional switching regulator (negative) 40. The output of current control amplifier 34 at an output line 41 is connected to bi-directional switching regulator 38 and to bi-directional switching regulator 40.

A bi-directional double throw switch 42 has a terminal 42A connected to a positive (+) output line 44 and another terminal 42B connected to the output of an inverter 46. Inverter 46 is connected at its input to a negative (−) output line 47. Output line 47 is connected to bi-directional switching regulator 40.

Bi-directional switching regulator 38 is connected to output line 44 at a circuit point 49 and to a common output line 50 at a circuit point 51. Bi-directional switching regulator 40 is connected to output line 47 at a circuit point 52A and to common output line 50 at circuit point 51. A DC output is provided across a capacitor 54 connected across output lines 44 and 50 and another DC output is provided across a capacitor 56 connected across output lines 47 and 50.

Switch 42 is connected to an error amplifier 58. A DC reference voltage is applied to error amplifier 58, and which error amplifier provides a difference output which is applied to four quadrant analog multiplier 30.

Switch control means 28 connected as described controls the operation of switches 26 and 42.

In operation, switch 26 is used to disconnect the inactive bi-directional switching regulator 38 or 40, as the case may be. As will be discerned, one bi-directional switching regulator, such as 38, is used for positive half cycles and the other, such as 40, is used for negative half cycles.

Current sensor 32 is bi-polar and, accordingly, analog multiplier 30 must be a four quadrant analog multiplier.

The circuit shown in FIG. 2 has two bulk storage capacitors 54 and 56, the voltages across which must be separately controlled. Switch 42 is included in the control loop so that only the active side of the circuit is controlled. Inverter 46 which is an analog inverter is also included in the negative DC output so that a separate negative voltage reference will not be required.

Figure 3:
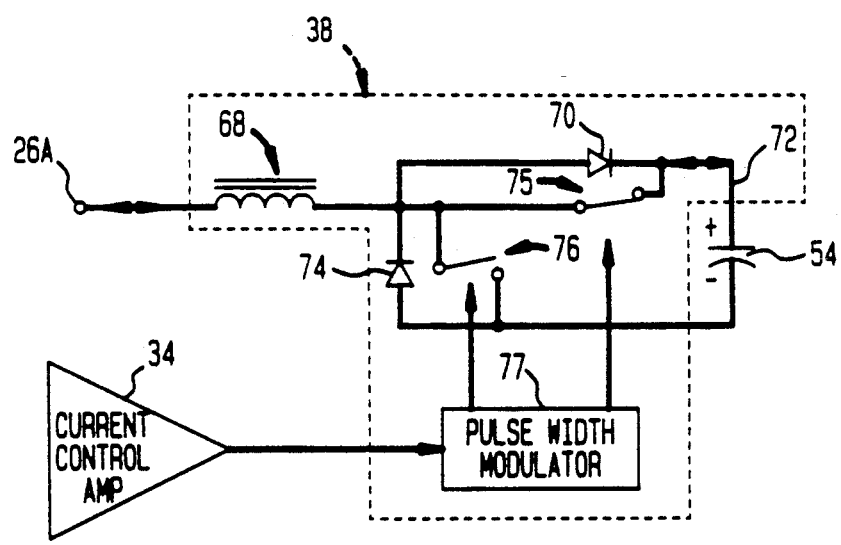
FIG. 3 is an electrical schematic diagram illustrating a bi-directional boost converter or switching regulator such as may be used in the invention as shown in FIG. 2.

In regard to bi-directional switching regulator circuits 38 and 40 shown generally in FIG. 2, the regulator circuit can be, for purposes of illustration, bi-directional boost converter circuits as shown in FIG. 3. However, it is to be noted that other circuitry such as buck or flyback circuitry can be used as well.

Thus, using the bi-directional boost converter circuitry of FIG. 3 and bi-directional switching regulator 38 as an example, the input to bi-directional switching regulator or boost converter circuitry 38 is from terminal 26A of switch 26 and therefrom via an inductor 68 and a diode 70 included in the switching regulator, and via a conductor 72 to bulk energy storage capacitor 54.

Switching regulator circuitry 38 includes a diode 74 and a switch 76 connected in parallel across capacitor 54 between inductor 68 and diode 70. A switch 75 is connected across diode 70. A pulse width modulator 77 controlled by current control amplifier 34, drives switches 75 and 76.

With the arrangement shown in FIG. 3, current control amplifier 34 controls regulator circuitry 38 so that one switch of switches 75 and 76, such as switch 75 as shown in the Figure, is closed by the output of pulse width modulator 77 and the other switch, such as 76, is simultaneously opened by a complementary output of pulse width modulator 77. This effects operation in a continuous mode at all times, as will now be discerned.

It will be appreciated by those skilled in the art that the circuit shown in FIG. 3 could be made to operate in a discontinuous mode, but this would require a more complex control arrangement. It is to be noted that the circuitry of FIG. 3 operates as a conventional boost converter for currents flowing into bulk energy storage capacitor 54, and as a buck converter for currents flowing out of the capacitor.

Although switching regulator 38 has been illustrated and described, the same illustration and description applies to switching regulator 40 when said switching regulator 40 receives an input from terminal 26B of switch 26, as will now be appreciated.

It will now be appreciated that the invention as described and shown with reference to FIG. 2 has distinct advantages. For example, an output voltage equal to the input voltage is provided (no regulation effect). Totally failsafe operation can be accomplished if fuses and circuit breakers are strategically located and if current sensor 32 is sufficiently rugged (e.g. a one turn transformer primary of No. 12 wire in series with AC input line 3). Further, no inherent energy storage is realized. That is to say, the output disappears at the instant the input disappears.

With further reference to FIG. 2, optional or auxiliary DC outputs which can be of use if DC outputs as well as AC outputs are required can be accomplished. This is provided by taking the DC output across capacitors 54 and 56 as shown in the Figure. There is inherent energy storage at these outputs.

Additionally, substantially one hundred percent efficiency with little power factor correction being required will be realized. In this regard, note that the load current does not flow through either bi-directional switching regulators 38 or 40.

It will be appreciated that AC load 37 could have a leading or lagging power factor, or can be an in-phase but pulsed load, such as those representative of uncorrected switching power supplies. While the design of the circuit shown in FIG. 2 could be optimized for a specific type of load, the invention herein described is of a generic nature and is capable of handling a load of any type.

With the above description of the invention in mind, reference is made to the claims appended hereto for a definition of the scope of the invention.

What is claimed is:

1. A low distortion alternating current output active power factor correction circuit, comprising:
    a pair of alternating current input lines;
    switching means connected to one of the pair of alternating current input lines;
    bi-directional switching regulator means connected to the switching means and operative in one polarity and in an opposite polarity;
    a current sensor connected to the other of the pair of alternating current input lines, with said current sensor providing an output at an output conductor;
    control means connected to the one of the pair of input lines, the current sensor output conductor and the switching means and effective for controlling the switching means to render the bi-directional switching regulator inactive in one of the one and the opposite polarities;
    the bi-directional switching regulator means connected to an output conductor in the one polarity, to an output conductor in the opposite polarity and to a common output conductor;
    a first bulk energy storage capacitor connected across the output conductor in one polarity and the common output conductor, with a direct current output being provided across said first capacitor;
    a second bulk energy storage capacitor connected across the output conductor in the opposite polarity and the common output conductor, with a direct current output being provided across said second capacitor; and
    a power factor corrected alternating current output being provided across the one alternating current input line and the output conductor of the current sensor for being connected to an alternating current load.

2. A circuit as described by claim 1, wherein the switching means includes:
    a bi-polar switch connected to the one of the pair of alternating current input lines and having first and second poles.

3. A circuit as described by claim 2, wherein the bi-directional switching regulator means connected to the switching means and operative in the one and the opposite polarities includes:
    a first bi-directional switching regulator connected to the first pole of the bi-polar switch and operative in the one polarity; and 4. A circuit as described by claim 3, wherein:
    the control means controls the bi-polar switch so that said switch is effective through one of the first and second poles for rendering one of the first and second bi-directional switching regulators inactive.

5. A circuit as described by claim 3, including:
    the first bi-directional switching regulator connected to the output conductor in the one polarity and to the common output conductor; and connected to the output conductor in the opposite sense and to the common output conductor.

6. A circuit as described by claim 3, including:
    an inverter connected to the output conductor in the opposite polarity and connected to the second bi-directional switching regulator, said inverter providing an inverted output;
    other switching means connected to the inverter and connected to the output conductor in the and
    the control means connected to the other switching means and effective for controlling said other switching means to render one output of the inverted output and an output at the output conductor in the one sense operative in the circuit.

7. A circuit as described by claim 6, wherein the other switching means includes:
    a bi-polar switch having a first pole connected to the inverter and a second pole connected to the output conductor in the one polarity.

8. A circuit as described by claim 6, including:
    an error amplifier connected to the other switching means for receiving the one output rendered operative in the circuit therefrom;
    a reference input received by the error amplifier; and
    said error amplifier providing an output corresponding to the difference between the received inputs.

9. A circuit as described by claim 8, including:
    multiplier means connected to the error amplifier, the current sensor and the one of the pair of alternating current input lines and responsive to inputs therefrom for providing a multiplied output;
    a current control amplifier connected to the multiplier means and the current sensor and responsive to the multiplied output and an output from the current sensor for providing a controlling output; and
    the first and second bi-directional switching regulators connected to the current control amplifier and controlled by the controlling output therefrom.

10. A circuit as described by claim 9, wherein:
    the multiplier means is a four-quadrant analog multiplier.

* * * * *